US005083103A

United States Patent [19]

Winter et al.

[11] Patent Number: 5,083,103

[45] Date of Patent: Jan. 21, 1992

[54] ENERGY MANAGEMENT ACCESSORY FOR CIRCUIT BREAKER

[75] Inventors: John M. Winter; Jerry L. Scheel; Matthew D. Sortland, all of Cedar Rapids, Iowa

[73] Assignee: Square D Company, Palatine, Ill.

[21] Appl. No.: 415,013

[22] Filed: Sep. 29, 1989

[51] Int. Cl.[5] ............ H01M 75/00

[52] U.S. Cl. ............ 335/14; 335/20; 335/6; 335/64

[58] Field of Search ............ 335/6, 14, 20, 64, 65

[56] References Cited

U.S. PATENT DOCUMENTS

| | | | |
|---|---|---|---|
| 2,709,725 | 5/1955 | Bieber et al. . | |
| 2,864,911 | 12/1958 | Brumfield | 335/65 |
| 2,864,912 | 12/1958 | Schmidt . | |
| 3,198,907 | 8/1965 | Archer et al. . | |
| 3,198,908 | 8/1965 | Staak | 335/65 |
| 3,332,043 | 7/1967 | Camp . | |
| 3,553,611 | 1/1971 | Briechle . | |
| 3,629,744 | 12/1971 | Maler et al. . | |
| 4,223,288 | 9/1980 | Stiner | 335/20 |
| 4,623,859 | 11/1986 | Erickson et al. . | |

*Primary Examiner*—Leo P. Picard
*Assistant Examiner*—Lincoln Donovan
*Attorney, Agent, or Firm*—Larry I. Golden; Jose W. Jimenez

[57] ABSTRACT

A circuit breaker control system includes a motor driven fork assembly, activated from a remote location, for simultaneously opening all of the breaker load contacts and locking them in an open condition. A DC voltage is selectively applied to energize the reversible DC motor. The switch at the remote location can be operated to enable a user-customer to return the breaker to operable condition at the breaker site. This is accomplished with an SCR circuit that is enabled by the remote switch and actuated by the user to operate the motor in a reverse direction to release the load contacts.

9 Claims, 4 Drawing Sheets

ENERGY MANAGEMENT ACCESSORY FOR CIRCUIT BREAKER

BACKGROUND OF THE INVENTION AND PRIOR ART

This invention relates in general to circuit breaker control systems and in particular to a circuit breaker control system that may be remotely activated to preclude operation of a circuit breaker.

In so-called energy management control systems, the individual main circuit breakers that control the supply of electrical power to various dwelling units or apartments are subject to owner or manager control. It is often desirable to enable the owner or manager to disable the electrical service to specific apartments or dwelling units. The reasons therefor are numerous, among the most important being safety in the event work is being performed in the apartment and control in the event the user-customer has not paid the rent or other assessments.

The system of the invention enables a conventional type circuit breaker to be used in an energy management control system by the addition of an energy management accessory that enables opening (and locking open) all of the load contacts of a circuit breaker from a remote location. The invention system utilizes low voltage control wiring and a small DC reversible motor for driving a fork and cam arrangement to open and lock the load contacts such that they may not be reclosed with the circuit breaker control handle. The accessory has an indicating device that alerts the resident that the accessory may be manually operated to return the breaker to normal operation. The enabling of the accessory is also controlled remotely by the owner/manager. Thus safety is achieved when performing electrical service and control of service under nonpayment conditions is made available.

OBJECTS OF THE INVENTION

A principal object of the invention is to provide a novel circuit breaker control system.

Another object of the invention is to provide an improved circuit breaker control system for locking open the load contacts of a circuit breaker from a remote location.

A further object of the invention is to provide a simple, cost effective energy management accessory for controlling a circuit breaker.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
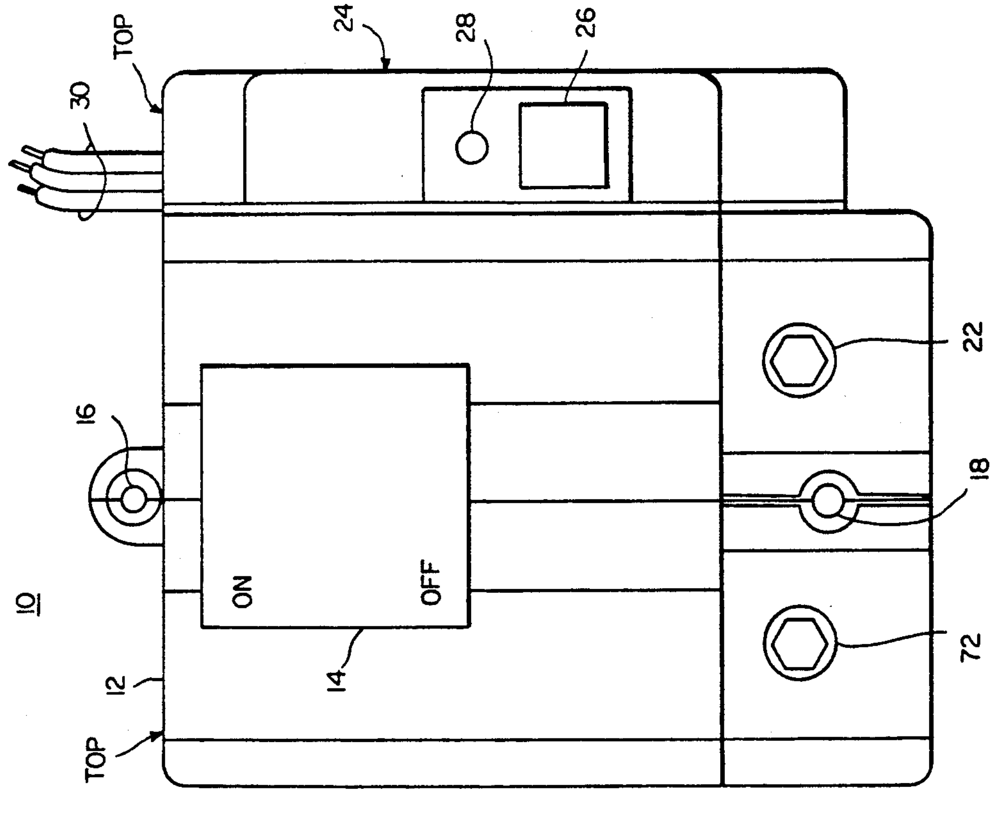
FIG. 1 is a view of a conventional two pole circuit breaker with an energy management accessory attached.

Referring to FIG. 1, a conventional two pole main circuit breaker 10 is illustrated. A housing 12, which may be constructed of plastic material, includes a rocker type circuit breaker handle 14 for mechanically opening and closing the breaker load contacts (not shown). A pair of mounting apertures 16 and 18 are used for mounting the breaker 10 to a suitable surface. A pair of terminals 20 and 22 are accessible for connecting to the line wiring. An energy management accessory device 24 is secured to one side of breaker 10 for opening the breaker load contacts and locking them in an open position. A push button switch 26 and an LED indicator light 28 are mounted on the front of accessory device 24 which is coupled to a remote location by a plurality of conductors 30. The top surface of the breaker is identified to assist in proper orientation of the accessory device 24 with respect thereto.

Figure 2:
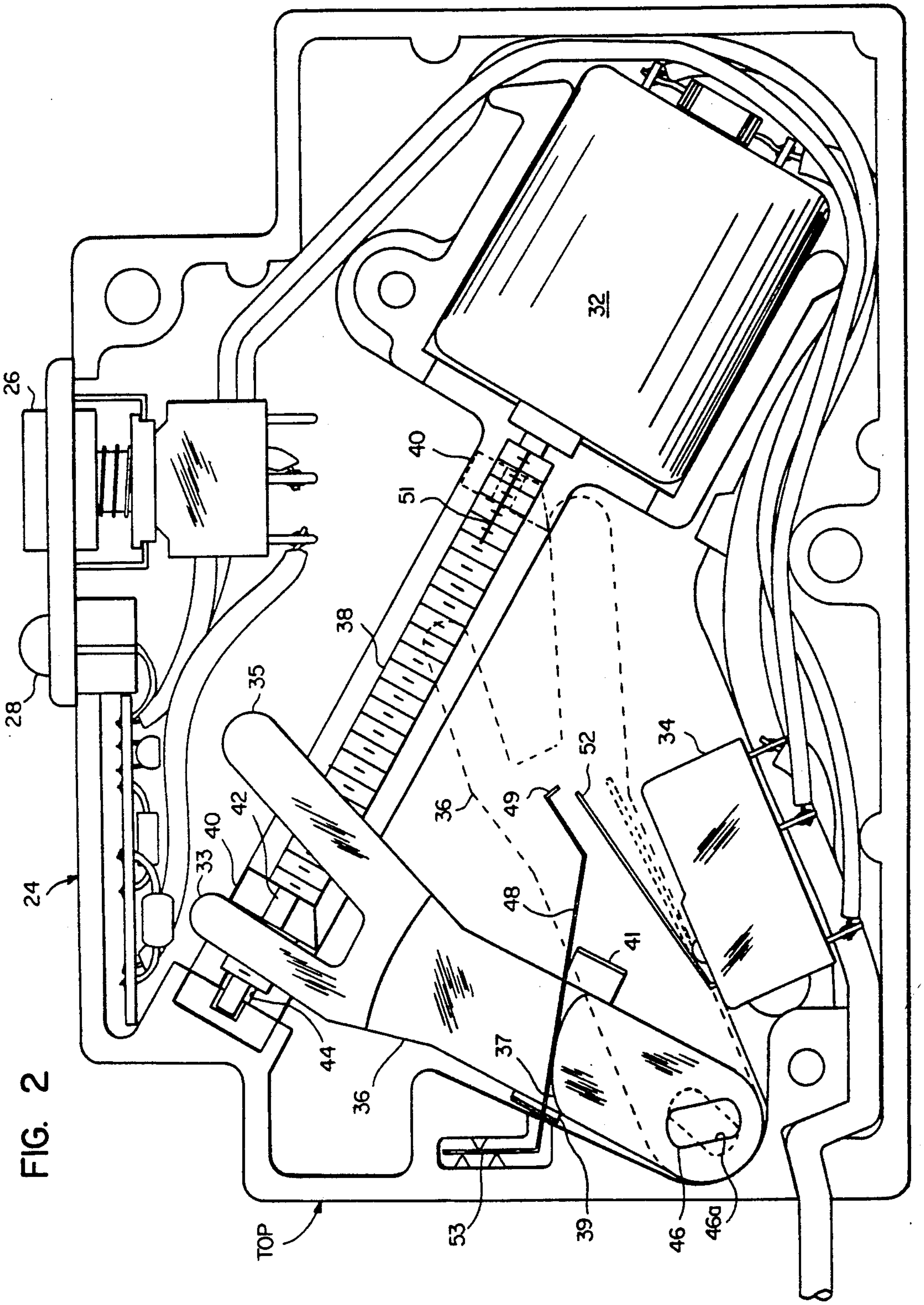
FIG. 2 is an enlarged interior view of the energy management accessory with the rotatable fork in its normal position.

FIG. 2 is a detailed drawing of the interior of accessory device 24 illustrating its working components. The top surface, corresponding to the top surface of the breaker, is identified. A high RPM bidirectional DC motor 32 of relatively small power is coupled to a lead screw 38 which is suitably supported for rotational movement in accessory device 24. A microswitch 34 is supported within the accessory 24 and includes an operating lever 52 that is engageable by a spring tab 41 affixed to a rotatable fork 36. Fork 36 includes a pair of displaced tines 33 and 35 which straddle a travelling nut 40 that threadingly engages lead screw 38. Travelling nut 40 includes a pair of opposed ridges 42 (only one of which is illustrated in this view) that travel in suitable opposed grooves 44 in the sides of accessory device 24. A shaft 46 of generally oval cross section is secured in a suitable aperture 46A in the base of fork 36 and, as will be shown, is coupled to a plurality of cam elements in mechanical means for opening the load contacts of the circuit breaker and for locking them in an open position despite movements of the breaker handle.

Fork 36 includes a cam surface 37 that engages a spring stop 48 having a hook portion 49 that is normally engageable with operating lever 52 of microswitch 34. Spring stop 48 is secured by any suitable means to accessory device 24 as, for example, at 53. The fork 36 is shown in its normal position with shaft 46 being in its farthest counterclockwise position. This corresponds to normal operation of circuit breaker handle 14 (FIG. 1). Another spring tab 39 is situated on the opposite side of fork 36. The dotted line fork 36 and nut 40 illustrate the lock position of fork 36 and corresponds to the breaker contacts locked open position of the accessory device. As should be obvious to those skilled in the art, operation of motor 32 in one direction (clockwise) will drive travelling nut 40 to the left and force fork 36 to its normal position by virtue of nut 40 engaging tine 33. Fork 36 is mounted for rotational movement in accessory housing 24 about an axis that is concentric with the axis of shaft 46. A pair of scribe lines 51 (only one of which is viewable) are formed in the end of lead screw 38 for providing resistance to travel of nut 40, as will be described.

Figure 3:
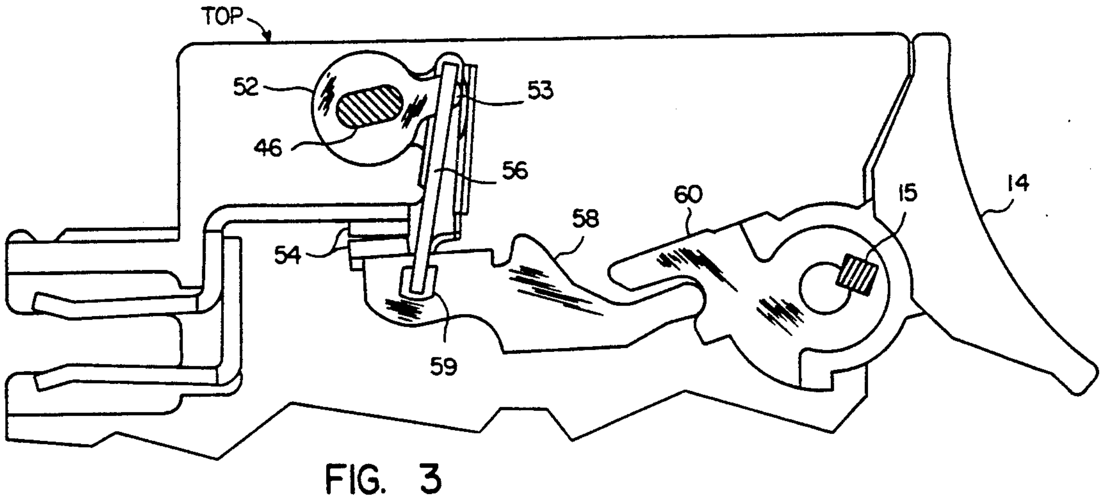
FIG. 3 is an enlarged partial view of the breaker assembly showing the load contacts in a closed position.
Figure 4:
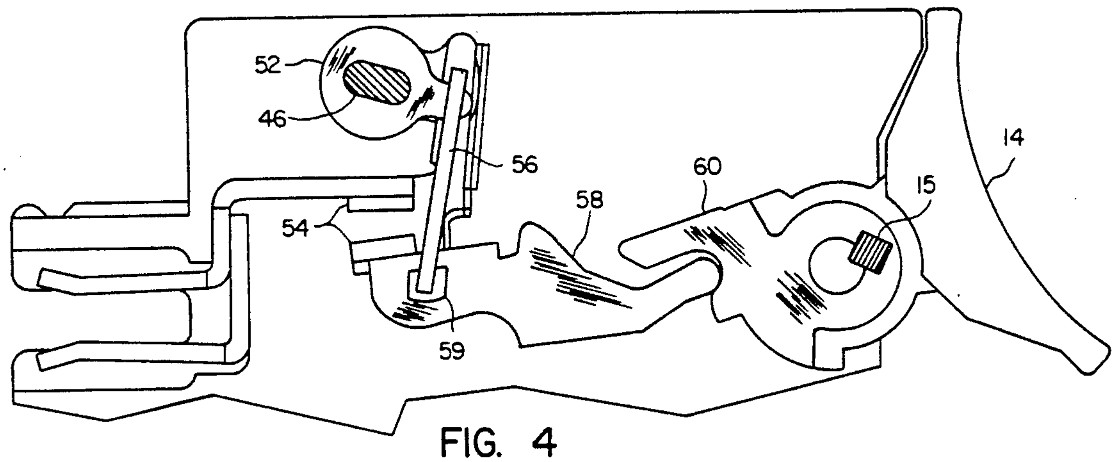
FIG. 4 is a view similar to FIG. 3 showing the load contacts in a locked open position.

In FIGS. 3 and 4 the mechanical means for opening load contacts 54 and for locking them open is partially illustrated. Shaft 46 is drivingly coupled to a cam element 52 that includes a tab 53 which engages a slide fiber 56. Slide fiber 56 further engages an orifice 59 in a contact carrier 58. The load contacts 54 are shown in their closed position with slide fiber 56 being in its uppermost position corresponding to cam element 52 being in its maximum counterclockwise orientation. Breaker handle 14 has a tiebar 15 that interconnects the operating mechanism 60 with the other circuit breaker operating mechanism (not shown). The circuit breaker assembly and its operation is conventional and needs no detailed description. The novel portion is the cam element 52 and the shaft 46 with the slide fiber arrangement for locking load contacts 54 open.

In FIG. 4 shaft 46 is shown in its maximum clockwise orientation in which slide fiber 56 is driven downwardly (in this figure) by tab 53 to force open load contacts 54. It will be appreciated that contact carrier 58 is spring loaded (by means not shown) to urge load contacts 54 into engagement. Consequently, slide fiber 56 operates against the spring loading of contact carrier 58 to maintain the load contacts 54 open, i.e. separated from each other. In this position, operation of handle 14 of the circuit breaker is ineffective to cause closure of load contacts 54 and handle 14 is rendered inoperative.

Figure 5:
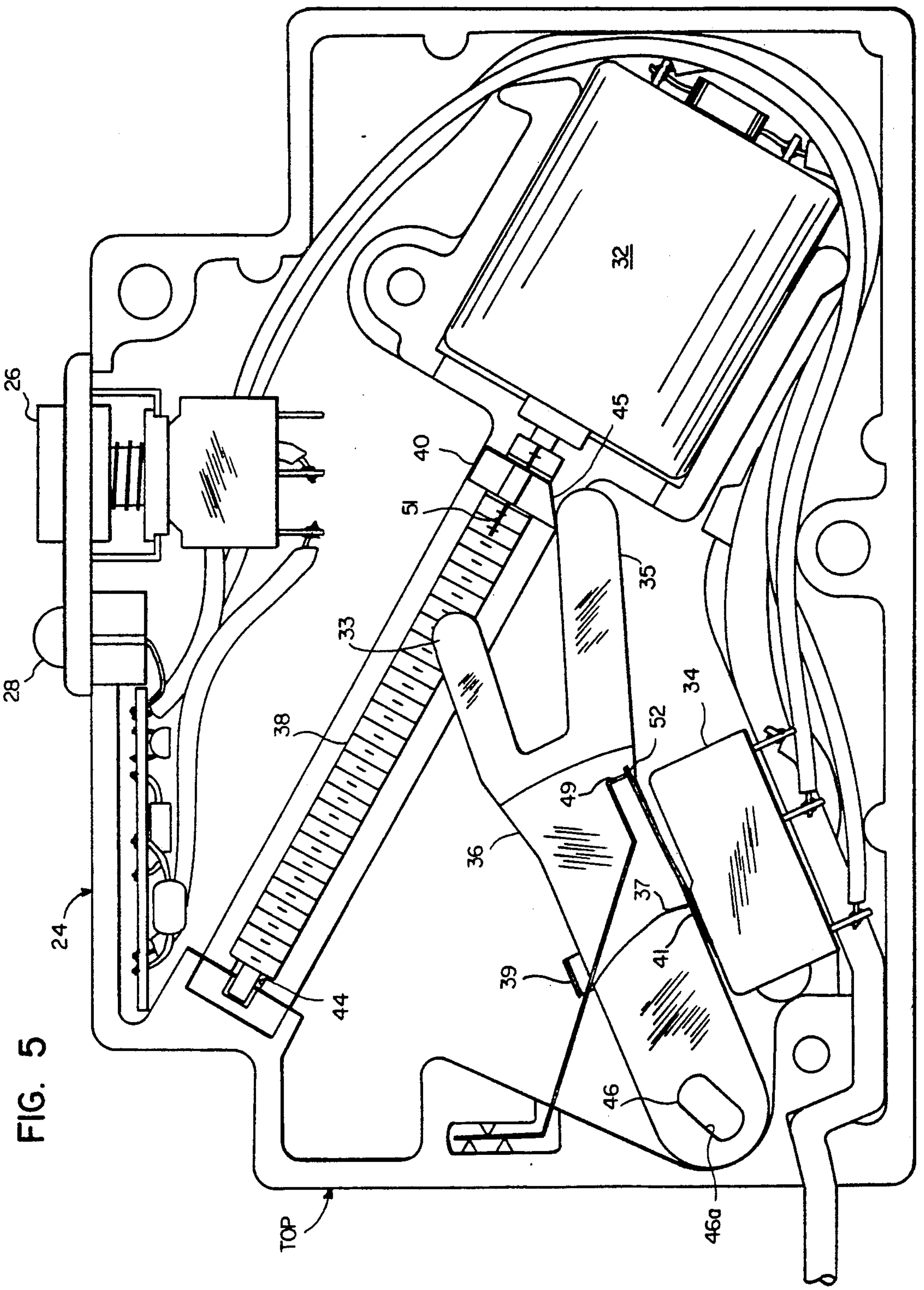
FIG. 5 is a view of the energy management accessory with the rotatable fork in its locked open position.

FIG. 5 illustrates the position of fork 36 in its full clockwise orientation, that is, in the lock position. Travelling nut 40 has a taper 45 that permits the nut 40 to slightly override tine 35 of fork 36. In this position, spring tab 41 is fully deflected toward the body of fork 36 as it engages and actuates the operating lever 52 of microswitch 34. Hook portion 49 of spring stop 48 initially lightly engages operating lever 52 until spring tab 41 sufficiently moves operating lever 52 to the right. As fork 36 continuous moving, spring tab 41 deflects operating lever 52 sufficiently to permit hook portion 49 to engage the operating lever farther along its length. The change in effective lever arm of operating lever 52 results in a snap action operation of microswitch 34 and positive, albeit delayed, operation of the microswitch contacts (not shown). With the fork 36 in the lock position shown in FIG. 5, voltage is removed from motor 32 and travelling nut 40 coasts along lead screw 38. Scribe lines 51 add a frictional resistance to preclude travelling nut 40 from going off the end of lead screw 38.

In returning to its normal position illustrated in FIG. 2, fork 36 is driven counter clockwise by travelling nut 40 and opens the contacts of microswitch 34 to interrupt power to motor 32 (which is operated in the reverse direction). Spring tab 39 engages a wall of accessory device 24 to cushion the cessation of movement of fork 36 and travelling nut 40.

In moving counterclockwise, spring tab 41 permits operating lever 52 to move against the resisting force of hook position 49 of spring stop 48, the force application is near the end of operating lever 52. As cam surface 37 engages spring stop 48 and deflects it, hook portion 49 disengages from operating lever 52 and resisting force is applied over a shorter lever arm which again allows a snap action movement of operation lever 52 and opening of the contacts of microswitch 34.

Figure 7:
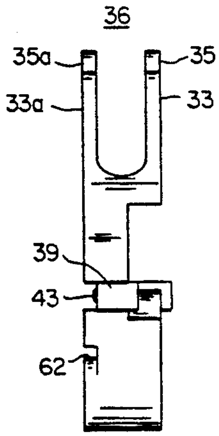
FIGS. 7 and 8 are respectively left and right elevational view of the fork of FIG. 6.
Figure 6:
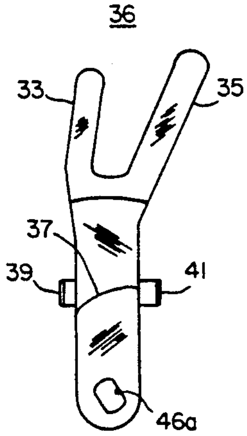
FIG. 6 is a plan view of the fork of the energy management assembly.
Figure 8:
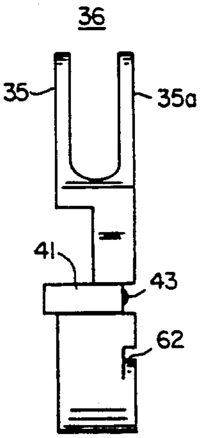

In FIGS. 6 through 8, details of fork 36 are shown. As illustrated, spring tabs 39 and 41 are made from a single piece of metal which is attached to the body of fork 36 by a pin 43. A circular bearing portion 62 at the base of fork 36 cooperates with a similarly shaped bearing aperture (not shown) in accessory device 24 to permit rotational movement of fork 36. Oval hole 46a in the base of fork 36 is adapted to firmly engage shaft 46.

Figure 9:
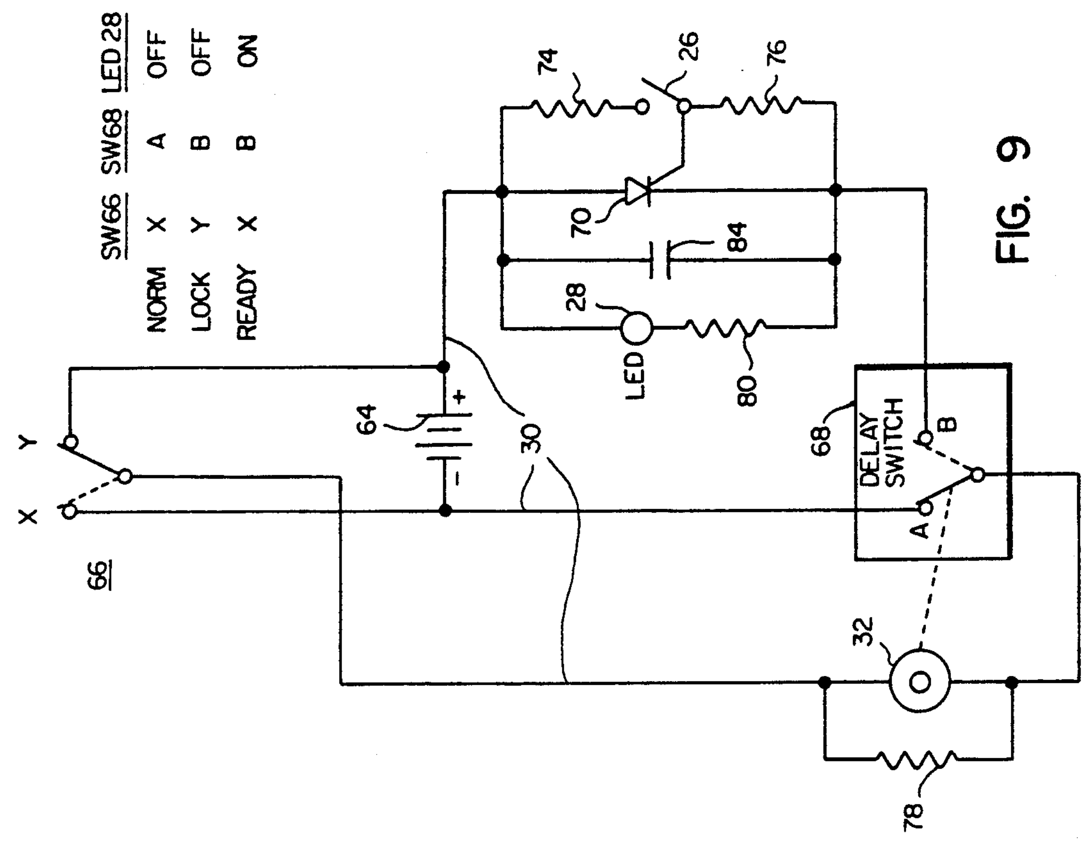
FIG. 9 is an electrical schematic diagram of the circuit breaker management system of the invention.

In FIG. 9, the electrical system for operating the energy management accessory device is shown. Wires 30 correspond to these shown in FIG. 1, as do the other like numbered components. A remote switch 66, i.e. one that is at a remote location, includes an ON and an OFF position. Switch 66 is under control of the building owner/manager and controls the opening and locking of the breaker contacts for the purposes enumerated previously. A 24 volt DC supply 64 is provided, preferably at a displaced point adjacent to remote switch 66. Battery 64 provides the energy for bidirectionally operating motor 32. A delay switch 68 is illustrated having a position A and a position B. As will be apparent, delay switch 68 comprises microswitch 34, fork 36, travelling nut 40 and lead screw 38. An SCR 70 has its anode connected to the positive terminal of battery 64, its cathode to the B terminal of delay switch 68 and has its gate coupled, via a push button switch 26, to the junction of a pair of resistors 74 and 76 which are connected across the SCR 70. A capacitor 84 is similarly connected to assure sufficient current flow to motor 32 to keep the SCR conductive under all load conditions encountered. An LED 28 is connected in series with a resistor 80 across SCR 70 and is illuminated when switch 68 is in its B position and switch 66 is in position X, corresponding to the breaker being operated from its open to its closed position. A resistor 78 is coupled across motor 32 for assuring sufficient drive current for SCR 70.

In operation, under normal operating conditions the fork 36 is in the solid line position illustrated in FIG. 2 which corresponds to the breaker load contacts 54 being closed as shown in FIG. 3. Should the breaker handle 14 now be moved from its OFF to its ON position, load contacts 54 will be opened and closed and normal breaker operation is achieved. Cam 52 is not physically attached to slide fiber 56 and permits movement of contact carrier 58. As mentioned, tab 53 engages a slot (not shown) in slide fiber 56 and therefore drivingly engages the slide fiber for one direction of movement only, namely to lock the breaker load contacts open.

For normal breaker operation, delay switch 68 is in position A and the remote switch 66 is in the X position. In this normal mode, it is not possible to operate SCR 70 since there is no circuit path through delay switch 68 and motor 32. LED 28 is, of course, not illuminated.

The tabulated information included in FIG. 9 indicates the positions of switches 66 and 68 and the illumination state of LED 28 for the Normal, Lock and Ready operating modes. In the Normal mode remote switch 66 is in the X position, delay switch 68 is in its A position (corresponding to shaft 46 being in its most counter clockwise position) and LED 28 is not illuminated. Should the owner/manager wish to open the load contacts of the main breaker and lock them open (or wish to lock them open if they are already open), remote switch 66 is moved to the Y position. The positive terminal of battery 64 is now connected through to motor 32 and the A contact of delay switch 68 to the negative terminal of the battery. As best seen in FIGS. 2 and 3, motor 32 rotates (in a clockwise direction) to drive fork 36 clockwise to the lock position whereat the breaker load contacts 54 are opened and locked and delay switch 68 is switched to the B position. In the Lock mode, there is no way to turn on SCR 70 to operate motor 32 in the counterclockwise direction to unlock the load contacts. LED 28 is off in both the Normal and Locked modes. Should the owner/manager wish to restore electrical service to the apartment, switch 66 is placed in the X position. This completes a circuit for SCR 70 through delay switch 68, (B position) motor 32 and battery 64. The LED 28 is turned on (illuminated) and indicates that the accessory control is in the Ready mode, i.e. control of the breaker load contacts has been returned to the breaker. Operation of pushbutton switch 26 fires the gate of SCR 70, rendering its anode-cathode circuit conductive and operating motor 32 in a counterclockwise direction. The operating lever 52 of microswitch 34 is held in a depressed condition (keeping the SCR circuit closed) by hook end 49 of spring stop 48 until cam surface 37 on fork 36 engages spring stop 48 and cams it out of the way. At this point, operating lever 52 moves and delay switch 68 goes from its B position to its A position, interrupting current flow in motor 32. Motor 32 coasts until fork 36 is brought to a stop by the action of spring tab 39 engaging the wall of accessory device 24. The LED 28 is turned off as soon as SCR 70 fires to start the motor operation. When delay switch 68 moves from its B to its A position, the breaker is back to normal operation with the remote switch 66 in the X position and delay switch 68 in its A position.

As has been described, the circuit breaker load contacts may be opened and locked open from a remote location by operation of the remote switch 66. Should the load contacts of the circuit breaker already be open, remote switch 66 may be operated to lock them in the open position. The motor load under the two conditions is significantly different, ranging from a zero force when the breaker load contacts are already open to approximately 80 ounces when the load contacts are closed. Consequently the motor 32, which operates at fairly high speed, experiences disparate loading, depending upon the position of the breaker load contacts. The provision of scribe lines 51 on the end of plastic lead screw 38 introduces sufficient friction to prevent travelling nut 40 from being driven off the end of the lead screw. Also tab springs 39 and 41 on fork 36 act as cushioning devices to bring motor 32 to a stop after it is deenergized. The provision of resistor 78 assures that the SCR current remains sufficiently high to prevent the SCR from being prematurely shut off in the event the motor is lightly loaded.

What has been described is a novel energy management control system for controlling operation of a circuit breaker from a remote location. It is recognized that numerous modifications and changes in the described embodiment of the invention will be apparent to those skilled in the art without departing from its true spirit and scope. The invention is to be limited only as defined in the claims.

What is claimed is:

1. A circuit breaker control system comprising:

a circuit breaker having load contacts:

handle means mounted on said circuit breaker for manually opening and closing said load contacts; and accessory means mounted on said circuit breaker, controllable from a remote location, for automatically opening said load contacts when accepted, if closed, and for preventing closing of said load contacts by said handle means: wherein said accessory means includes:

a bidirectional DC motor;

a threaded lead screw driven by said motor;

nut means mounted for movement along said lead screw;

delay switching means for controlling energization of said motor as a function of the position of said nut means on said lead screw; and mechanical means for locking said load contacts open.

2. The circuit breaker of claim 1 wherein said delay switching means includes a rotatable fork having a normal position and operatively coupled to said mechanical means, said rotatable fork having a pair of displaced tines selectively engageable with said nut means.

3. The circuit breaker of claim 2 further including a switch at said remote location for applying a DC voltage to said motor for rotating said fork from said normal position into a lock position whereat said mechanical means locks said load contacts open.

4. The circuit breaker of claim 3 wherein said rotatable fork includes a cam surface and a spring tab and further including;

a microswitch having an operating lever actuatable by said spring tab;

stop means engageable with said operating lever for preventing actuation thereof by said spring tab; and said cam surface engaging and moving said stop means out of engagement with said operating lever.

5. The circuit breaker of claim 4 further including an SCR circuit, enabled by said remote switch, for operating said motor to drive said fork back to said normal position.

6. The circuit breaker of claim 5 further including a DC supply for supplying operating voltage to said motor and to said SCR circuit;

a momentary contact switch in said SCR circuit for initiating conduction therein; and an LED coupled across said SCR circuit for indicating when said SCR circuit is enabled.

7. The circuit breaker of claim 6 wherein there ar a plurality of sets of load contacts, and wherein said mechanical means simultaneously locks said plurality of sets of load contacts open in response to said fork moving to said lock position.

8. A circuit breaker control system comprising:

a circuit breaker having a set of load contacts;

handle means mounted on said circuit breaker for manually opening and closing said load contacts;

a bidirectional DC motor;

a threaded lead screw driven by said motor;

a travelling nut movable along said lead screw;

delay switching means comprising a rotatable fork having a pair of tines selectively engageable with said travelling nut, and having a normal position for controlling energization of said motor as a function of the position of said travelling nut on said lead screw;

mechanical means, responsive to said fork being moved to a lock position, for automatically opening said load contacts when closed and for preventing closing of said load contacts by said handle means; and said motor being controllable from a remote location to move said fork to said lock position.

9. The circuit breaker of claim 8 wherein said fork includes a cam surface and a spring tab and further including;

a microswitch having an operating lever actuatable by said spring tab;

a spring loaded stop engageable with said operating lever for preventing actuation thereof by said spring tab;

said cam surface engaging and moving said spring loaded stop out of engagement with said operating lever;

an SCR circuit, enabled from said remote location, for operating said motor to drive said fork to said normal position;

a DC power supply for supplying operating voltage to said motor and to said SCR circuit;

a push button switch in said SCR circuit for initiating conduction therein when said SCR circuit is enabled; and an LED coupled across said SCR circuit for indicating when said SCR circuit is enabled.

* * * * *